United States Patent [19]
Einaru et al.

[11] Patent Number: 5,346,334
[45] Date of Patent: Sep. 13, 1994

[54] APPARATUS FOR INJECTING SOIL CONDITIONING FLUID

[75] Inventors: Kikuo Einaru, Tokyo; Shinsuke Seko, deceased, late of Tokyo, by Tomio Seko, legal representative; Tomio Seko, Tokyo, all of Japan

[73] Assignee: SunEarth Co., Ltd., Tokyo, Japan

[21] Appl. No.: 856,974

[22] PCT Filed: Jul. 24, 1991

[86] PCT No.: PCT/JP91/00979
§ 371 Date: May 21, 1992
§ 102(e) Date: May 21, 1992

[87] PCT Pub. No.: WO92/01840
PCT Pub. Date: Feb. 6, 1992

[30] Foreign Application Priority Data
Jul. 24, 1990 [JP] Japan .................. 2-195201
Apr. 3, 1991 [JP] Japan .................. 3-071071

[51] Int. Cl.$^5$ .................................. E02D 3/12
[52] U.S. Cl. ............................ 405/269; 405/262
[58] Field of Search ............ 405/12, 258, 262, 263, 405/266, 267, 269

[56] References Cited
U.S. PATENT DOCUMENTS
932,719  8/1909  Reinhardt ............................ 405/12
4,711,604 12/1987 Heimsoth et al. ............. 405/262 X

FOREIGN PATENT DOCUMENTS
44118   3/1983  Japan .
218512 12/1983  Japan .
55117   3/1985  Japan .
231056  5/1986  Japan .

Primary Examiner—David H. Corbin
Attorney, Agent, or Firm—Keck, Mahin & Cate

[57] ABSTRACT

An apparatus is provided for injecting a conditioning fluid into a soil foundation. The apparatus is light in weight and easy to handle, performs fixing, moving and boring work while requiring not much time, and is excellent in working performance. The apparatus for injecting the conditioning fluid includes a boring machine for boring the soil foundation and injecting the soil conditioning fluid into the soil foundation for hardening. Magnet fixtures secure the boring machine to a magnetic wall surface supporting the soil foundation or to a magnetic wall surface mounted on a member supporting the soil foundation. Further, a control panel, capable of remotely controlling switch valves for water and conditioning fluid in this kind of apparatus, is formed as a separate body from the apparatus body.

4 Claims, 6 Drawing Sheets

APPARATUS FOR INJECTING SOIL CONDITIONING FLUID

FIELD OF THE INVENTION

This invention relates to a soil conditioning fluid injecting apparatus for injecting a soil conditioning fluid into a soil foundation for the purposes of reinforcement thereof in a civil engineering work such as ground work, and particularly in a ground work where a pipe such as Hume pipe or steel pipe is required to be passed between upstanding piles.

PRIOR ART

Figure 6:
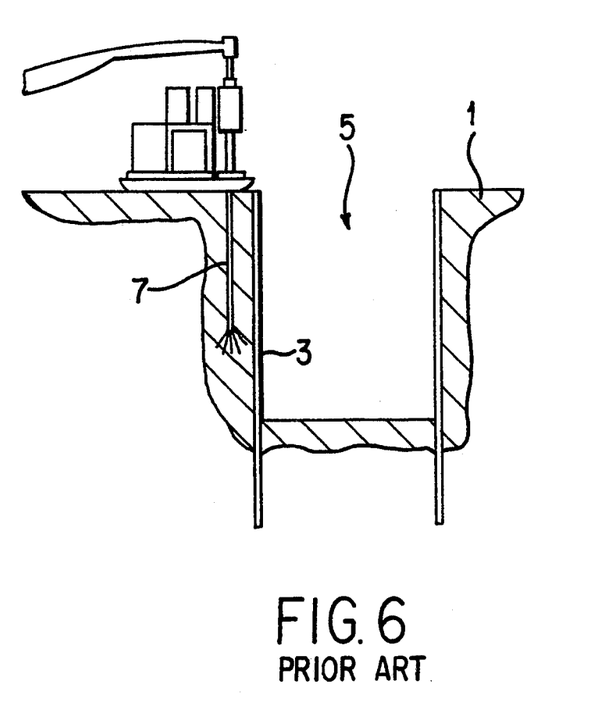
FIG. 6 is a schematic view showing a comparable conventional apparatus now working at the site where the soil conditioning is required.

This type of an apparatus for injecting a soil conditioning fluid is heretofore used for the purposes of reinforcement of a cavity 5 which is formed by removing soil from an area surrounded by steel sheet piles 3 which have been piled into a soil foundation 1 as shown in FIG. 6. This apparatus is usually installed in the vicinity of an open top of the cavity 5 and operated to inject a soil conditioning fluid into the soil foundation 1 through a rod 7 for the purposes of reinforcement after the soil foundation 1 has been bored with a cutter attached to a front end of the rod 7.

However, when the rod 7 is thrust deep into the soil foundation 1, the apparatus is necessarily encountered with reaction to be incurred to the rod 7. In order to cope with the reaction to be incurred to the rod 7, the apparatus is required to have a heavy weight, or it is required to be fixed to the ground by piles piled into the ground. The trouble is that the area of the soil foundation required to be reinforced is deep under the ground surface, and therefore, a long rod 7 is necessary. For this purpose, the rod 7 is required to be rigid. In addition, it takes a long time for boring. Moreover, because of the reason that the diameter of the rod 7 is shorter than that of a cutter, it gives rise to another problem that an injected soil conditioning fluid tends to leak out upwardly from around the rod 7 within a boring hole and spreads over a wide range of area exceeding a desired position, with the results that a large quantity of soil conditioning fluid and a long injection time are wasted. Furthermore, after the injection is over, it usually takes a considerably long time to set up a device and instrument for removing the fixture means which is necessitated by the heaviness of the apparatus.

Where the apparatus is to be installed within the cavity 5 in order to bore the soil foundation in a horizontal direction, a foothold is required, and/or the apparatus is required to be more firmly fix to the ground and/or it is required to be made even heavier in order to cope with a horizontal reaction. It is therefore an object of the present invention to provide an apparatus for injecting a soil conditioning fluid, which is light in weight and easy to handle, in which fixing, moving and boring work does not take much time, and which is excellent in working performance.

MEANS AND EFFECTS FOR SOLVING THE PROBLEM

To achieve the above object, an apparatus for injecting soil conditioning fluid according to the present invention includes a boring machine for boring a soil foundation and injecting a soil conditioning fluid into the soil foundation for hardening; and magnet fixture means for sucking and securing said boring machine to a magnetic wall surface supporting the soil foundation or to a magnetic wall surface mounted on a member supporting the soil foundation.

By virtue of the foregoing constitution, the apparatus of the present invention is no more required to be heavy. The apparatus can be reduced in weight because it is magnetically sucked to a magnetic body, e.g., a steel sheet pile, in order to release the reaction caused by a digging work. Accordingly, not only transportation of the apparatus becomes easy but also handling of the apparatus becomes easy. When an area for injecting the soil conditioning fluid is required to be shifted in the same direction, i.e., in the horizontal direction, it can be done so with a simple operation. Especially, since the first fixing work of the apparatus can be effected by means of a magnetic force, a shifting operation in a horizontal direction can be performed without having a feel of heaviness of the apparatus.

Furthermore, since the soil conditioning fluid is not injected from the ground surface as in the prior art but is injected from a wall surface near to the apparatus into an area right behind the wall surface, only a least necessary quantity of the fluid can be injected into only a required area in the soil foundation. As a result, a limited injection is available. Accordingly, it never occurs that the soil conditioning fluid comes upwardly from around the boring as in the prior art.

Because of the foregoing reason, there can be provided an apparatus for injecting a soil conditioning fluid which is light in weight and easy to handle, in which fixing, moving and boring work does not require much time, and which is excellent in working performance.

EMBODIMENT

The present invention will now be described with reference to the drawings.

In the following description, identical or similar parts or members to those of the prior art are represented by identical reference numerals and duplicate description will be omitted.

An apparatus S for injecting a conditioning fluid according to the present invention comprises a boring machine (hereinafter simply referred to as the "machine") M for boring a soil foundation and injecting a soil conditioning fluid into the soil foundation for hardening, and an apparatus body N for supplying a soil conditioning fluid to the machine M, for example. The machine M has a magnet fixture means for sucking and securing this machine M to a magnetic wall surface.

The machine M will be described first. In the drawings, the reference numeral 10 denotes a base which exhibits a rectangular planar configuration. The base 10 is provided at each longitudinal side thereof with, for example, a steel guide rail 11 having an antiwear property. Both the guide rails 11 are connected with each other by a flat plate 13 made of a light alloy such as, for example, aluminum and nickel. Of course, it may be made of a steel where rigidity is required. It may also be provided with a weight reduction hole or holes, not shown, in order to reduce its weight.

Figure 3:
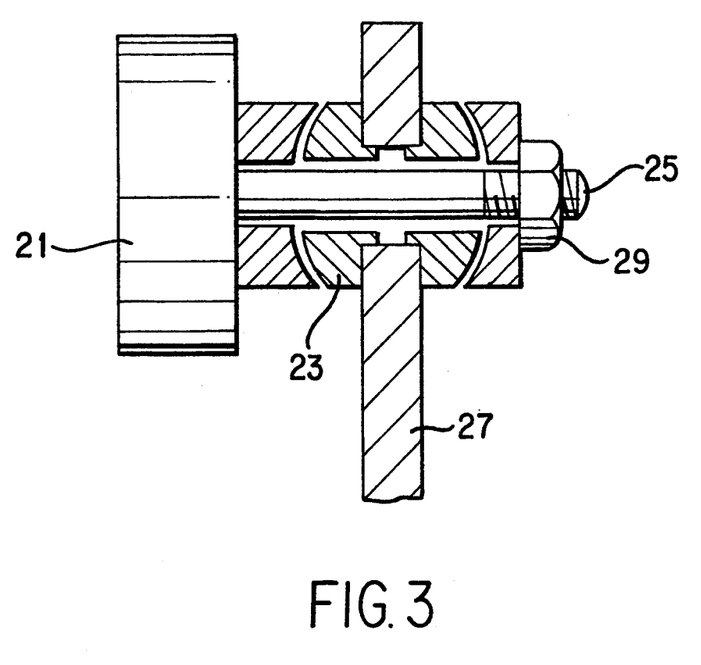
FIG. 3 is a sectional view of an important portion of a fixture means.

The base 10 is provided at one surface side thereof with magnet fixture means 20. This magnet fixture means 20 has one or more legs 21. In case two or more legs 21 are to be provided, each of the legs 21, which are to be magnetically attached to, for example, a magnetic steel wall surface such as a steel sheet pile 3 or liner plate, is magnetically attached to the steel sheet pile 3 at free angles through a universal joint 23. That is, even if the steel sheet piles 3 piled around the cavity 5 formed in the soil foundation 1 have angles, surfaces of the legs 21 are intimately attached to the steel sheet piles 3 through the universal joints 23 as shown in FIG. 3. Each of the disc-shaped legs 21 uses an electromagnet or permanent magnet and is provided at its opposite surface to the surface which is intimately attached to the steel sheet pile 3 with the universal joint 23 having a concave spherical surface and a convex spherical surface which are in sliding contact with each other. A bolt 25 loosely inserted into each of the universal joints 23 penetrates a connection plate 27 interconnecting the legs 21 and serves to secure each of the legs 21 to the connection plate 27 by a nut 29.

In case two of such legs 21 are to be provided, each side is provided with one leg 21, and the connection plate 27 can be omitted. In case of one leg 21, the universal joint 23 is not necessarily required.

In this example, the connection plate 27 serves to interconnect two legs 21 disposed lengthwise at each end of the base 10. That part of the leg 21, which is to be attached to and detached from the base 10, is provided with a block-like thick portion 27a, either integrally or separately. This thick portion 27a is provided with a bolt hole, not shown, while the flat plate 13 of the base 10 is provided with a number of boring holes 15 corresponding to the bolt hole. The boring holes 15 are bored into such a depth as that a head of the bolt would not project from the surface of the flat plate 13.

Accordingly, each of the connection plates 27 is movable in the longitudinal direction of the base 10, thus enabling to select a lengthwise mounting space as well as the position of a mounting plane of the leg 21. It should be understood, however, that even if the number of the legs 21 is limited to four, the magnet fixture means 20 is not limited to the arrange wherein two magnet fixture means 20 are connected with each other through one connection plate 27, but the magnet fixture means 20 may, of course, be independently attached to the base 10.

On the opposite surface side of the base 10 to the surface side to which the fixture means 20 is attached, there is disposed a movable base 30 slidingly movable with respect to the base 10 in such a manner as to hold a guide rail 11. This movable base 30 is provided with a fixing handle 31 which is capable of fixing the movable base 30 in a desired position of the base 10, and has an upstanding plate 33.

A slide base 40 having an axial guide rail 41 perpendicular to a plane formed by the two guide rails 11 mounted on the slide base 40 is mounted on the movable base 30 such that the inclination of the slide base 40 can be adjustable.

This slide base 40 is provided with a slider 50 which is reciprocally slidable in a direction perpendicular to the plane formed by the guide rails 11, guided by the axial guide rail 41 and a dovetail groove 51. This slider 50 is reciprocally slid along the axial guide rail 41 by a mechanism such as rack and pinion, not shown, upon manipulation of a handle 43 as a second drive means mounted on the slide base 40.

A hollow rod 60 is mounted on the slider 50 in such a manner as to be able to rotate but unable to move in the axial direction in parallel relation to the axial guide rail 41. That is, the slider 50 has a chuck 53 and a pulley 55 both rotatably mounted thereon. The slider 50, which comprises the above-mentioned parts, permits the long hollow rod 60 to penetrate therethrough and a projecting length of the hollow rod 60 is determined by the chuck 53. By fastening a fastener ring 57 disposed in such a manner as to contact the pulley 55, rotation of the pulley 55 driven a motor as a first drive means 67 is transmitted to the hollow rod 60.

The hollow rod 60 has a hole-saw type cutter 61 removably attached to a front end thereof, the cutter 61 provided with teeth around a cylindrical edge thereof. The material forming the cutter 61 is selected from those able to bore the steel sheet pile 3 and soil foundation 1. The hollow rod 60 also has a hose 65 connected to a rear end thereof through a swivel connector 63 adapted to prohibit the transmission of rotation of the hollow rod 60 to the hole 65, and adapted to supply a soil conditioning fluid. There are two types of the hollow rod 60; one is of a single pipe and the other is of a double pipe. The type of the hollow rod 60 is suitably selected depending on the type of a soil conditioning fluid to be used, i.e., single fluid type or double fluid mixed type. In a case of the double fluid mixed type, the double fluid is mixed with each other at the hole-saw type cutter for the first time, so that the fluid would not be hardened in the mid-way.

Figure 1:
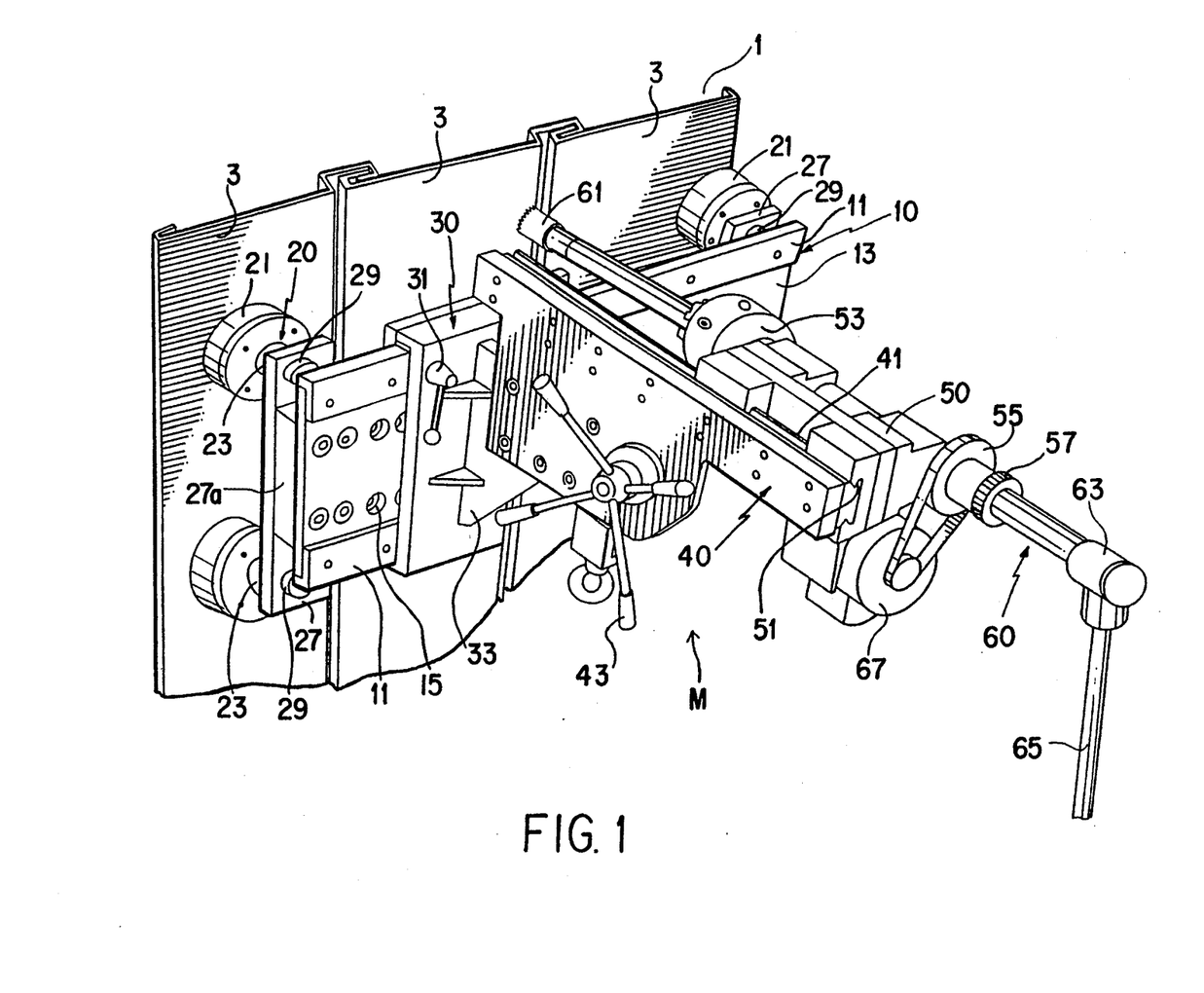
FIG. 1 is a perspective view of an apparatus for injecting a conditioning fluid embodying the present invention.
Figure 2:
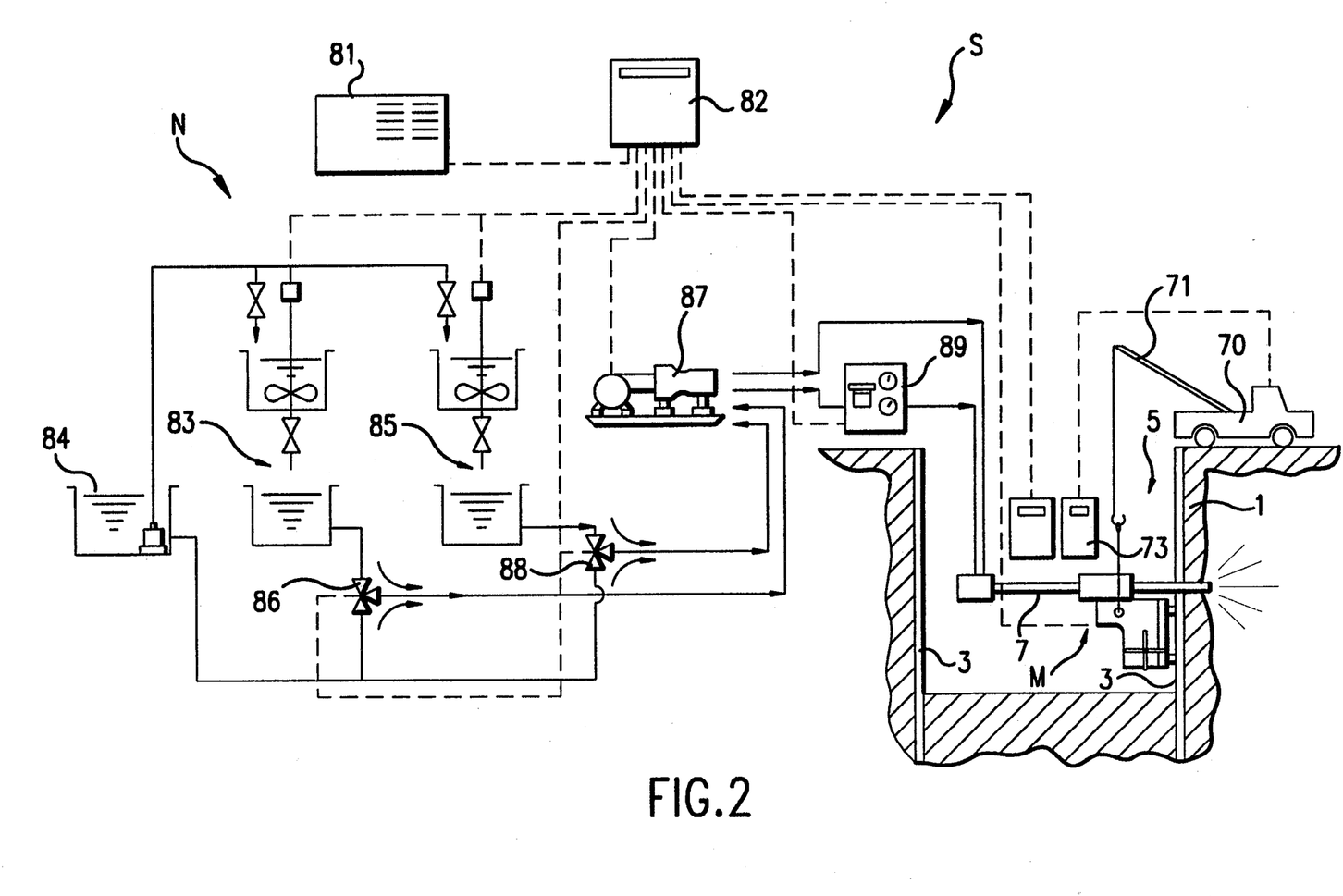
FIG. 2 is a schematic view showing the entirety the above apparatus.

A whole view of the soil conditioning fluid injecting apparatus S as a system using this machine M is depicted in FIG. 2. The way of the use of this apparatus S will be described hereinafter.

The steel sheet piles 3 are piled into required position in the soil foundation 1, and ballast in the area surrounded by the piles 3 is removed to form a steel wall surface and to define a cavity 5 as a space. The cavity 5 is formed large enough for entering therein the machine M, or it may be applied to a wall surface or the like instead of a hole.

A wheeled crane or crawler crane 70 is stopped on the side of the cavity 5, and the machine M is hung by the crane 71 into the cavity 5 and lowered to a position for injecting a soil conditioning fluid by a crane remote control panel 73, which is likewise hung down into the cavity 5.

Next, the legs 21 are held in conformity with a flat surface of the steel sheet pile 3 and magnetically sucked and attached thereto by means of a switching operation, etc. In the event an appropriate position cannot be selected, the bolt in the boring hole 15 is loosened to adjust the position of the leg 21 of each fixture means 20. Even if the mounting surface of the leg 21 is not in a coplane, the leg 21 can be intimately attached to the steel sheet pile 3 by the universal joint 23.

When its depthwise position has been established, a fixing handle 31 is then loosened to move the movable base 30. After an injecting position in a horizontal direction is established, the fixing handle 31 is tightened for fixture.

On the other hand, various devices and instruments within the system connected to a generator 81 are actuated by commands coming from a control panel 82. In this embodiment, a conditioning fluid of a double fluid mixed type is used. An A-fluid is added with water coming from a water tank and agitated by an A-fluid agitator 83, and then a required quantity of the A-fluid is pooled in a lower tub. Similarly, a B-fluid is agitated by a B-fluid agitator 85 and then pooled in order to prepare a conditioning fluid.

The hollow rod 60 is rotated by the first drive means 67 of the machine M, and the handle 43 as the second drive means is manipulated to cause the hole-saw type cutter 61 to cut a circular hole in the steel sheet pile 3. At that time, when the hole-saw type cutter 61 is clogged with cut-out materials of the steel sheet pile 3, these materials are removed. Otherwise, the soil foundation 1 is directly bored. Since the hardness of the steel sheet pile 3 and that of the soil foundation 1 are different, an inverter control is effected in order to regulate the speed of rotation of the first drive means 67. For boring the soil foundation 1, water in the water tank 84 is caused to pass through the hollow rod 60 by a pump 87 through a three-way valve 86 in order to enhance the discharge of blast and to facilitate boring. When a predetermined depth is reached, a water supply is stopped by closing the three-way valve 86. Then, the A-fluid and B-fluid are sent from the A-fluid agitator 83 and B-fluid agitator 85 via separate routes by the three-way valves 86, 88 through the pump 87 while measuring the flow rate by a flowmeter 89, and mixed with each other at the front end of the hollow rod 60 where the hole-saw type cutter 61 is located and then permeated into a predetermined range of the soil foundation 1. The soil conditioning fluid is then solidified to harden the soil foundation 1 for reinforcement.

Upon completion of injection of the soil conditioning fluid at one place, the hollow rod 60 is moved to another place by moving the movable base 30 in order to carry out another injection. When it becomes impossible to effect the injection because of the length of the base 10, the position of the base 10 is moved in the manner as mentioned above and the same operation is performed.

As described in the foregoing, the machine M of this embodiment is an apparatus S for injecting a conditioning fluid, which is light in weight, easy to handle, requires less time for fixing, moving and boring works, and excellent in working performance.

Figure 4:
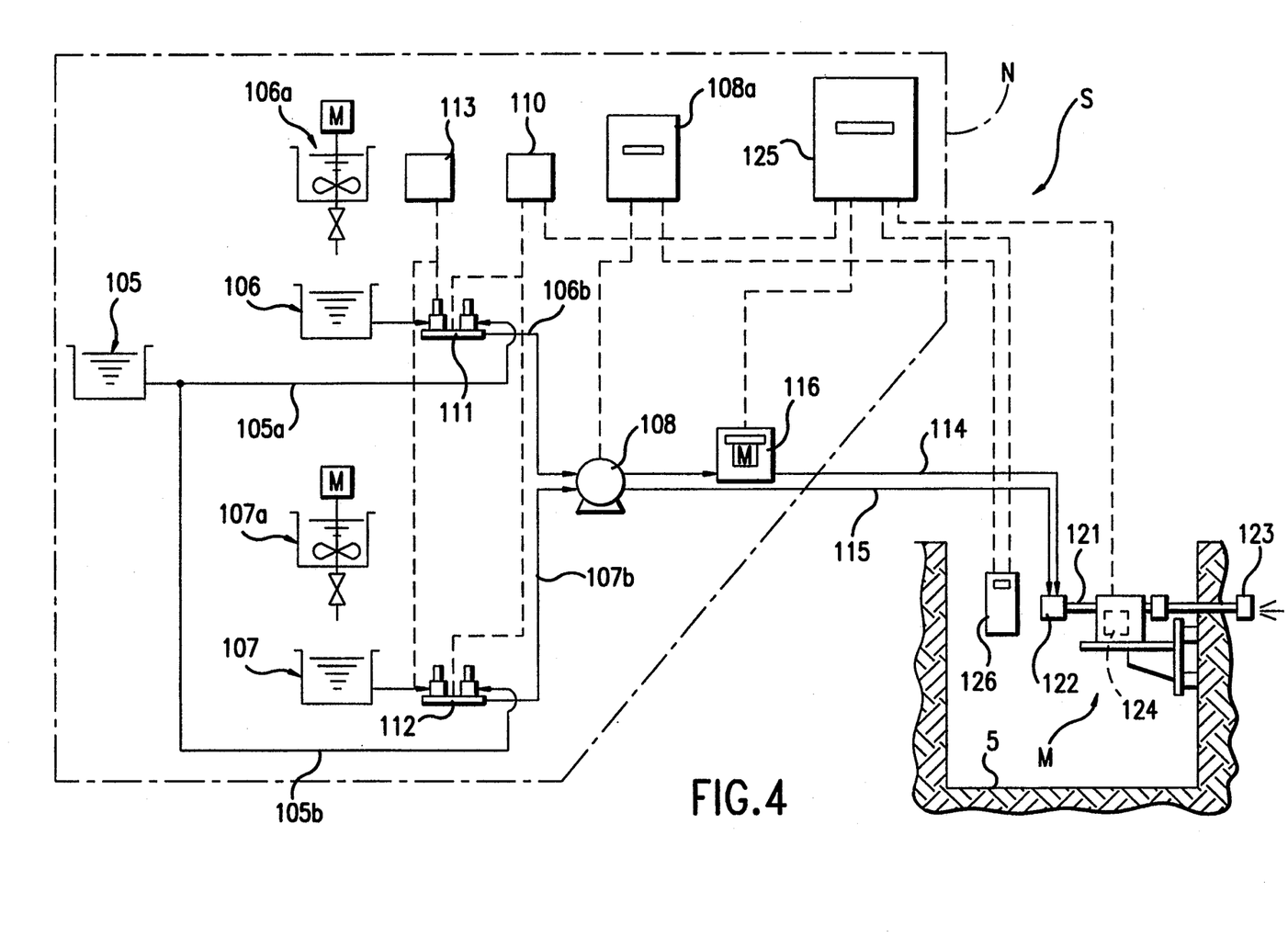
FIG. 4 is a schematic view showing the entirety of an apparatus for injecting a conditioning fluid according to another embodiment of the present invention.

The apparatus body N of the apparatus S for injecting a conditioning fluid, as a system, may also be constituted such as shown in FIG. 4.

The entire apparatus S, as in the preceding embodiment, comprises an apparatus body N, a machine M, hoses and electric cables for interconnecting the apparatus body N and the machine M, and a control panel.

The entire apparatus body N is installed on a load-carrying platform of a truck.

This apparatus body N has a water tank 105, an A-fluid tank 106 and a B-fluid tank 107 for composing a double fluid type soil conditioning fluid, and is further provided with a pump 108 for feeding these water and conditioning fluid under pressure.

The A-fluid tank 106 and B-fluid tank 107 as a conditioning fluid tank is provided with an agitator 106a or 107a respectively, so that the A-fluid and B-fluid properly prepared by being agitated by these agitators 106a and 107a would be supplied to the A-fluid tank 106 or B-fluid tank 107, respectively.

The pump 108 is a chemical pump of a four-cylinder twin type, which does the same discharging actions in two independent systems. This pump 108 is driven by an electric motor, and said drive is controlled by a pump control panel 108a such that the discharging quantity would be variable by an inverter.

The A-fluid tank 106 and B-fluid tank 107 are connected to the pump 108 through two lines, i.e., an A-fluid pipeline 106b or a B-fluid pipeline 107b, respectively. These pipelines 106b and 107b are provided with a switch valve 111 or 112, respectively.

These switch valves 111 and 112 are connected with a water supply pipe 105a or 105b extending from the water tank 105, respectively.

The switch valve 111 is operated to switch the water to be supplied to the pump 108 to the A-fluid, while the switch valve 112 is operated to switch the water to the B-fluid. Actions of these switch valves 111 and 112 are effected in accordance with output from a valve control box 110.

These switch valves 111 and 112 are opened and closed by an air cylinder, not shown, and are actuated by compressed air supplied from a compressor 113.

The two lines of the pump 108 are connected at discharging ports thereof with an A-fluid supply pipeline 114 or a B-fluid supply pipeline 115 formed of a pressure hose directing toward the machine M. Only on the side of the A-fluid supply pipeline 114 is disposed a flowmeter comprising an electromagnetic flowmeter.

The reason of the foregoing arrangement is that since the pump 108 of this embodiment is of a twin type and the discharging actions in the respective lines are the same, a supplying quantity of a conditioning fluid to the machine M can be obtained by measuring the flow rate in the A-fluid supply pipeline 114.

The front end of the A-fluid supply pipeline 114 and the front end of the B-fluid supply pipeline 115 are connected to a rear end of a hollow rod 121 of the machine M placed within the cavity 5 through a swivel connector 122, so that the water and conditioning fluid would be discharged from a discharging port at its the front end via the interior of the hollow rod 121.

This discharging port, although not shown, is formed in the center of an inner side of a hole-saw type cutter 123 which will be described hereinafter.

The hollow rod 121 is provided at its front end with the hole-saw type cutter 123 as a boring device. The arrangement being such that when the hollow rod 121 is rotationally driven about its axis by the electric motor 124, the hole-saw type cutter 123 is caused to bore the steel sheet pile placed on the wall surface of the cavity 5 and the soil foundation.

As discussed in the above, in this apparatus S, since both the steel sheet pile and soil foundation are bored by the hole-saw type cutter 123 and since the speed of rotation of the hole-saw type cutter 123 is preferably watched and properly adjusted depending on the hardness of the soil foundation, the electric motor 124 is controlled by a machine control panel 125.

That is, this machine control panel 125 is designed such that by controlling a power source of the machine M, the speed of rotation of the electric motor 124 is variably controlled by the inverter. The machine control panel 125 has such a function as that of a main controller of the apparatus S as will be discussed later.

A control panel 126, which is connected to the machine control panel 125 and pump control panel 108a through a cable, is formed as a separate body from the apparatus body N. Further, the control panel 126 is formed light in weight and compact so that it can be conveniently carried as a portable type panel. This control panel 126 is located in the vicinity of the machine M within the cavity 5.

Figure 5:
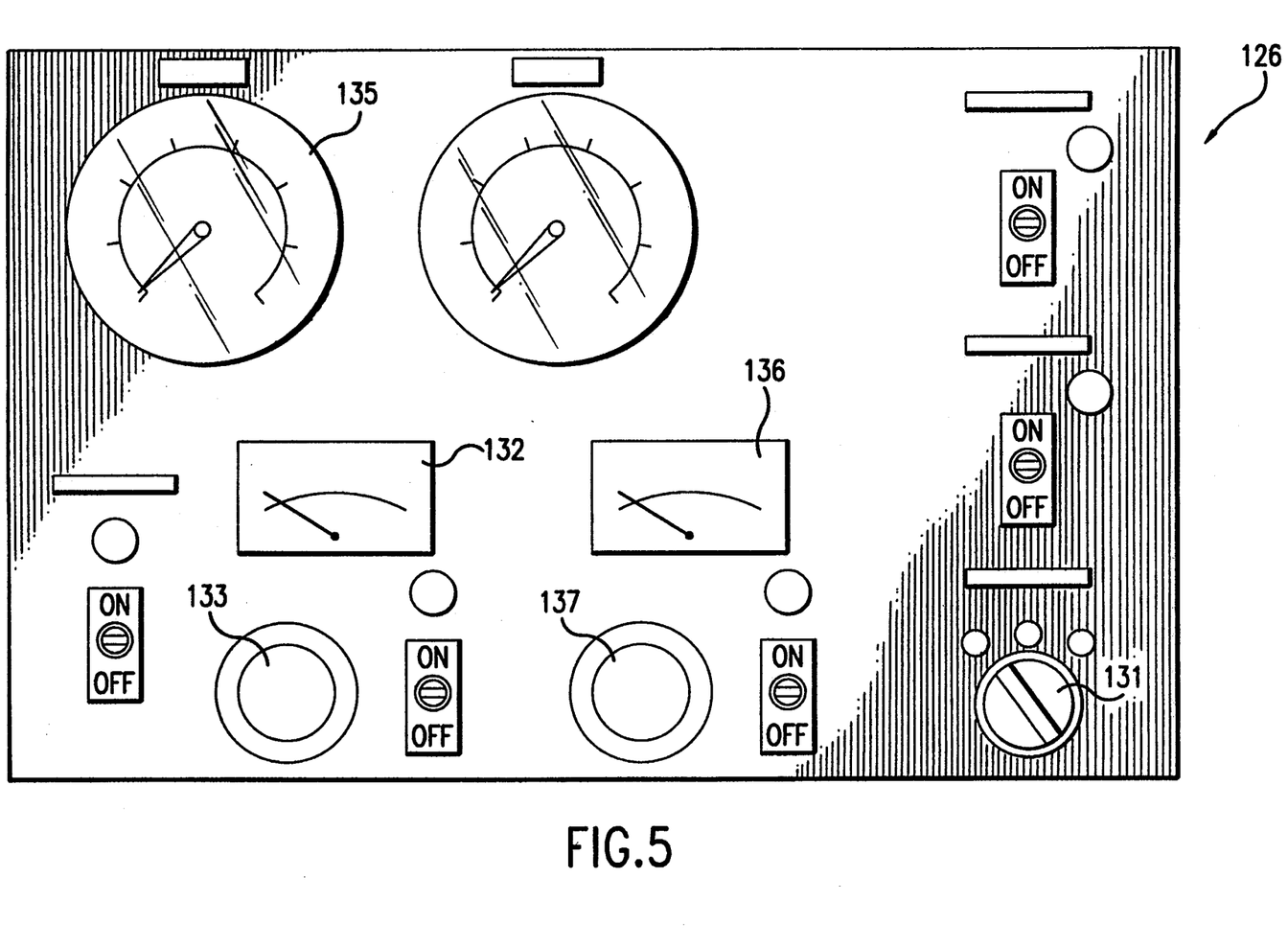
FIG. 5 is a plan view showing the surface of a control panel of the embodiment of FIG. 4.

This control panel 126 is provided with a control switch 131 for controlling the open- and closed-states of the switch valves 111 and 112, an indicator 132 for indicating the speed of rotation of the pump 108, a regulation handle 133 for regulating the speed of rotation of the pump 108, an indicator 135 for indicating a flow rate measured by the flowmeter 116, an indicator 136 for indicating the speed of rotation of the hollow rod 121 driven by the electric motor 124, a regulation handle 137 for regulating the speed of rotation of the hollow rod 121, etc., (see FIG. 5).

The control switch 131 for controlling the open- and closed states of the switch valves 111 and 112 is operated to have the switch valves 111 and 112 effect the opening- and closing actions in accordance with its output via the machine control panel 125 and valve control box 110.

The indicator 132 for indicating the speed of rotation of the pump 108 and the regulation handle 133 for regulating the speed of rotation of the pump 108 directly effect input and output between the pump control panel 108a, indicate the speed of rotation of the pump 108 and regulate the speed of rotation of the pump 108.

The indicator 135 for indicating the flow rate is adapted to indicate a flow rate signal measured by the flowmeter 116 via the machine control panel 125.

The indicator 136 for indicating the speed of rotation of the hollow rod 121 rotationally driven by the electric motor 124 is adapted to indicate a signal coming from a tachometer, not shown, mounted on the machine M via the machine control panel 125. The regulation handle 137 for regulating the speed of rotation of the hollow rod 121 is operated to vary the value of a power source current as a target value for the machine control panel 125. By this, the speed of rotation of the hollow rod 121 is regulated.

By installing such control panel 126 in the vicinity of the machine M within the cavity 5, an operator of the machine M can do his job for operating the machine M, actuating the switch valves 111, 112 and the like while directly watching those indications.

That is, in this embodiment, the operator can watch the state of accompanying work through the control panel 126 while directly watching the boring work, etc. made by the machine M as an objective work to be made by the apparatus S. Accordingly, the operation can be properly made at a good timing. Since a possible interference to the objective work caused by delay of the accompanying work or by other reasons is diminished, working performance is enhanced.

In addition, since the work to be made by the apparatus body N is reduced, working power can be saved. In a normal work, a worker on the side of the apparatus body N can concurrently engage in other work or the work on the side of the apparatus body N can be performed by no one.

What is claimed is:

1. An apparatus for injecting a soil conditioning fluid into a soil foundation including:
    a boring machine for boring the soil foundation and injecting said soil conditioning fluid into the soil foundation for hardening; and
    magnet fixture means for securing said boring machine to one of a magnetic wall surface supporting the soil foundation and a magnetic wall surface mounted on a member supporting the soil foundation;
    said boring machine including:
    a planar base having guide rails on opposite sides thereof and a magnet fixture means for securing said planar base to said magnetic wall mounted thereon;
    a movable base mounted on said planar base, said movable base being slidable along said guide rails and able to be secured in a desired position;
    a slide base disposed on said movable base and having an axial guide rail extending in a perpendicular direction relative to a plane formed by said guide rails;
    a slider engaged with and guided by said axial guide rail of said slide base and reciprocally slidable in said perpendicular direction and a hollow rod rotatably mounted on said slider and having a hole-saw type cutter at a front end thereof, said hollow rod being capable of injecting the soil conditioning fluid from a rear end portion thereof into the soil foundation through said cutter;
    first drive means for rotating said hollow rod; and
    second drive means for reciprocally moving said slider.

2. An apparatus for injecting a soil conditioning fluid into a soil foundation comprising:
    an apparatus body having a water tank, a conditioning fluid tank, a pump for feeding at least water and conditioning fluid under pressure, and a switch valve for switching a first pipeline leading from said water tank and conditioning fluid tank to said pump;
    a boring machine located at a position spaced apart from said apparatus body and having a hollow rod with a boring device attached at a front end thereof, a front end of said hollow rod being formed with a discharging port for discharging the water and conditioning fluid fed under pressure from said pump, said boring machine and said apparatus body being interconnected by a second pipeline, said boring machine including
    (a) a planar base having guide rails on opposite sides thereof and a magnet fixture means for securing said planar base to a magnetic wall mounted thereon;
    (b) a movable base mounted on said planar base, said movable base being slidable along said guide rails and able to be secured in a desired position;
    (c) a slide base disposed on said movable base and having an axial guide rail extending in a perpendicular direction relative to a plane formed by said guide rails;
    (d) a slider engaged with and guided by said axial guide rail of said slide base and reciprocally slidable in said perpendicular direction and a hollow rod rotatably mounted on said slider and having a hole-saw type cutter at a front end thereof, said hollow rod being capable of injecting the soil conditioning fluid from a rear end portion thereof into the soil foundation through said cutter;

(e) first drive means for rotating said hollow rod; and (f) second drive means for reciprocally moving said slider; and a control panel, capable of remote controlling said switch valve, formed as a separate body from said apparatus body.

3. An apparatus for injecting a soil conditioning fluid according to claim 2, wherein said control panel is provided with an indicator for indicating a speed of rotation of said boring machine and a regulator for regulating the speed of rotation of said boring machine.

4. An apparatus for injecting a soil conditioning fluid according to claim 3, wherein said apparatus body has a flowmeter disposed therein and adapted to measure a quantity of discharged fluid by said pump and said control panel is provided with an indicator for indicating a value measured by said flowmeter.

* * * * *